United States Patent Office 3,537,967
Patented Nov. 3, 1970

1

3,537,967
RADIATION STERILIZED, THIODIPROPIONIC ACID ESTER STABILIZED, PROPYLENE POLYMERS
Joseph M. Kelley, Westfield, and Paul J. Marinaccio, Tenafly, N.J., assignors to Dart Industries Inc., a corporation of Delaware
No Drawing. Filed July 29, 1966, Ser. No. 568,746
Int. Cl. B01j 1/10
U.S. Cl. 204—159.18                    14 Claims

ABSTRACT OF THE DISCLOSURE

A radiation sterilized article having improved color manufactured from a polypropylene polymer with a substantial crystalline content which has up to one percent of an ester of thiodipropionic acid incorporated as a stabilizer.

---

This invention relates to compositions of propylene polymers which have been subjected to sterilizing radiation. The invention relates more specifically to propylene polymer compositions of specific characteristics which have been subjected to sterilizing dosages of gamma radiation.

Polypropylene, and specifically polypropylene of a substantial crystalline content has been applied to many new uses, which uses have required that the polymer be processed or treated in a particular manner. For example, because of the high melting point of polypropylene and its ready availability, it can be used in the manufacture of articles for medical use. Such uses, for example, include the manufacture of syringes, forceps, surgical clamps, but obviously before any such article can be safely used, it requires that it be sterilized. Previous attempts to sterilize polypropylene by a sterilizing dose of high energy radiation have resulted in discoloration of the polymer. This discoloration can occur for a variety of reasons, namely the use of certain additives in the polymer, as well as the fact that some propylene polymers contain high amounts of catalytic residues such as titanium and chlorine.

It is an object of this invention to provide compositions of matter of polymers of propylene which are resistant to discoloration upon sterilization by high energy radiation.

It is a further object of this invention to provide shaped articles of polymers of propylene which can be used for medical purposes, which shaped articles have been subjected to a sterilizing dose of high energy radiation.

The objects of this invention, namely the manufacture of shaped articles of a substantially natural colored polymer of propylene are accomplished by subjecting a polymer of propylene having a crystalline content at least about 40%, said polymer having incorporated therein as a stabilizer from 0 to about 1.0% of a diester of thiodipropionic acid, said diester containing from 8 to 50 carbon atoms.

In the course of experimentation with sterilizing dosages of gamma radiation, in order to prepare polymers of propylene which would not discolor upon said treatment, it was found unexpectedly that a polymer of propylene having a substantially crystalline content, preferably above 40%, and containing less than 50 parts per million total ash residues, responded excellently to said treatment.

2

In fact, the natural color of the original polymer remained substantially completely unaffected by subjecting it to the gamma ray treatment indicated. It was found, for example, that the polymer alone, that is, without any additives and containing less than 50 parts per million total ash residues gave substantially the best color, while a polymer of propylene containing up to 1% of a diester of thiodipropionic acid similarly responded with excellent color retention. When other known stabilizers were incorporated into the polymer and then subjected to gamma ray treatment, there resulted highly colored materials which are not useful for certain medical purposes, such as for syringes where neither the natural color of the polymer is desired or a clear polymer. The examples will illustrate this phenomena.

The polymers of propylene applicable for use according to this invention are homopolymers of propylene containing from 40, preferably about 60% crystalline content as determined by X-ray (or other known methods), and as high as 80 to 90%. Random propylene-ethylene copolymers (or propylene-alpha-olefin copolymers with alpha-olefin monomers such as butene-1 and higher, for example, containing up to 10 carbon atoms) can also be employed provided the crystalline content thereof remains above about 40%. Such crystalline content is required for articles for medical use where rigidity and stiffness is a useful property. Clear or substantially clear polymers of polypropylene, followed by a block of polyethylene or a block of random ethylene-propylene copolymers (or random propylene-alpha-olefin monomer, said monomer containing from 4 to 10 carbon atoms) can likewise be employed, especially where clarity of the polymer is a desirable feature. It is known that certain block copolymers of propylene and ethylene possess this desirable clarity and accordingly, such block copolymers are preferred for specific applications of this invention.

In general, the radiation treatment can be applied to polymers of propylene useful particularly for medical purposes; however, this should not be understood to be a limiting factor as the sterilization treatment can be applied to the propylene polymers for any use for which such a treatment is required (such as for meat packaging).

The high energy radiation useful for sterilization purposes is conveniently provided by a cobalt 60 source. Other sterilizing radiation treatment, however, can be used, such as high energy X-rays, so long as the sterilization is accomplished by this treatment. The dosage applied to the polymer should be sufficient only to sterilize the composition. For the propylene polymers of this invention, it has been found that an article of manufacture such as a syringe can be effectively sterilized by applying 2.5 megarads under a beam of gamma radiation, which treatment includes passing the sample at least twice under the beam of a gamma radiation. Passage of the sample under the beam for two times allows for sufficient radiation for the sterilization of the syringe. In general, however, radiation dosages that can be applied range from about 2.5 to about 6 megarads.

Since radiation is believed to form radicals which interact with the polymer to either shorten the chain length or cross-link the composition, it is necessary to select a polymer possessing initially a melt flow of between about 0 to 10 (ASTM–D–1238–62T) at 230° C. and a 2160 gram load. Where a polymer of this melt flow is irradiated in accordance with this invention, then the melt flow of the treated polymer will not exceed 50, preferably 40. Less critical molded parts might have a higher permissible melt flow, keeping in mind, however, its application and brittleness properties required therefor.

The additives which have been found extremely well-suited for use as stabilization ingredients of this invention in amounts of from about 0 to 1% by weight, preferable 0.001 to 0.4%, of the total polymer composition consist of a diester of 3,3'-thiodipropionic acid having the formula:

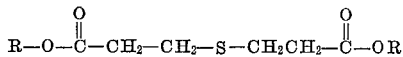

wherein R is an alkyl radical having at least 4 carbon atoms and up to about 22. It is preferred, however, that in this composition R is an alkyl radical of 8 to 18 carbon atoms. A particularly effective diester has R groups containing 18 carbon atoms, namely distearyl thiodipropionate, while another ester has R groups containing 12 carbon atoms, namely dilauryl thiodipropionate. Others are: butyl, amyl, hexyl, heptyl, octyl, nonyl, decyl, tridicyl, myristyl, pentadecyl, cetyl, heptadecyl, stearyl and eicosyl diesters of 3,3'-thiodipropionic acid or mixtures thereof.

The following examples illustrate the invention without limiting it.

EXAMPLE 1

Employing a cobalt 60 source for gamma radiation, ten tensile bar specimens of a homopolymer of polypropylene having at least a 60% crystalline content and measuring 8½ by ¾ by ⅛ inches were irradiated in two passes with a dose of 2.5 megarads. The table below indicates physical properties of the polymer as well as additive levels and observations with respect to color change.

EXAMPLE 2

A tensile bar made of polypropylene containing less than 50 parts per million catalyst residues and of a crystalline content greater than 60% and a melt flow of 7.5 was irradiated in two passes (2.5 megarads) with gamma rays from a cobalt 60 source in a manner similar to Example 1. The sample bar was stabilized with 0.15% by weight of distearyl thiodipropionate and its tensile properties were as follows prior to irradiation: Tensile yield 4590; tensile fail 2820. After irradiation, the color of the original bar remained unchanged, but its melt flow, as expected, increased to 45.2, while tensile values changed as follows: Tensile yield 4780 and tensile fail 2770. According to this example, it is seen that if a polymer of lower melt flow is required after the irradiation treatment, then a polymer of lower melt flow is chosen for the sterilization treatment.

Resort can be made to modifications and equivalents falling within the scope of the appended claims.

What is claimed is:

1. A shaped article of manufacture of substantially natural color comprising a propylene polymer having a crystalline content of at least about 40%, said propylene polymer having incorporated therein as its only stabilizer from 0.001 up to about 1.0% of an ester of thiodipropionic acid, said ester containing from 4 to 50 carbon atoms and said shaped article having been subjected to a sterilizing dose of at least 2.5 megarads of gamma radiation.

2. The article of claim 1 wherein the propylene polymer is a homopolymer and wherein the crystalline content is at least 60 percent.

3. The article of claim 1 wherein the stabilizer is di-

TABLE

| Sample Number | Polymer | Crystallinity, percent | Ash, p.p.m.[1] | Additives, percent [2] | Color |
| --- | --- | --- | --- | --- | --- |
| 1 | PP [3] | 60 | 50 | 0.3 DSTDP | Natural. |
| 2 | PP [3] | 60 | 50 | 0.1 "Santo White" Powder | Yellowish. |
| 3 | PP [3] | 60 | 50 | 0.1 "Ionol" | Do. |
| 4 | PP [3] | 60 | 50 | 0.1 "Ionol", 0.1 DSTDP | Yellow. |
| 5 | PP [3] | 60 | 50 | 0.1 "Ionol", 0.2 DSTDP | Vivid yellow. |
| 6 | PP [3] | 60 | 50 | 0.3 "Ionol" | Yellowish. |
| 7 | PP [3] | 60 | 50 | 0.1 "Ionol", 0.1 "Polygard HR". | Yellow. |
| 8 | PP [3] | 60 | 50 | None | Natural. |
| 9 | PP [3] | 60 | 50 | 0.2 "Polygard HR", 0.2 "Ionol" | Yellowish. |

[1] Ash consists mainly of titanium and aluminum.
[2] DSTDP=Distearyl thiodipropionate; "Santo White"=4,4-butylidenebis (6-tertiary butyl metacresol); "Ionol"=2,6-ditertiarybutyl-4-methylphenol; "Polygard HR"=Trisnonylphenyl phosphite.
[3] Polypropylene.

The above example demonstrated that outstanding non-discoloring results could be achieved only with Samples 1 and 8. As a matter of fact, due to the low ash residues, Sample 8 had the best color, that is, natural, unchanged, of all the samples treated. Sample 1 nevertheless retained substantially completely its natural color and illustrates that amounts of the stabilizer distearyl thiodipropionate of 0.3 percent by weight can be satisfactorily employed, said amounts being beneficial in stabilizing the polymer during processing to prevent execessive melt flow degradation and also to stabilize to some extent against the effects of ionizing radiation, whereas a total combined or single amount of two or one of the other additives approaching 0.3 percent by weight resulted in badly discolored samples (yellowish to bright yellow).

The combination of two or more stabilizers as shown in Samples 4, 5 and 7 pronouncedly increased discoloration even when distearyl thiodipropionate was one of the ingredients and was used in major amounts (Sample 5). The reason for this is not understood, but possibly some interaction occurs between the additive systems.

stearyl di-thiodipropionate and the propylene polymer is a homopolymer.

4. The article of claim 1 wherein the propylene polymer is a propylene homopolymer containing no more than 50 parts per million total of metal and chloride residues.

5. The article of claim 1 wherein the propylene polymer is a copolymer of propylene and an alpha-olefin containing from 2 to 18 carbon atoms.

6. The article of claim 1 wherein the propylene polymer is a homopolymer and the stabilizer is dilauryl di-thiodipropionate.

7. The article of claim 1 wherein the propylene polymer is a homopolymer containing at least 60 percent crystalline content and wherein distearyl di-thiodipropionate is employed as the stabilizer in amounts of from 0.001 to 0.4 percent by weight.

8. A syringe of substantially natural color manufactured from polypropylene having a crystalline content of at least 60% and less than 50 parts per million of metal and chloride contaminating residues, and having incorporated therein as a stabilizer from 0.001 to 0.4% by weight of an ester of thiodipropionic acid, said ester containing from 4 to 22 carbon atoms, said syringe having been exposed to a sterilizing dose of at least 2.5 megarads of gamma radiation.

9. The syringe of claim 8 having incorporated therein distearyl thiodipropionic acid.

10. The syringe of claim 8 having incorporated therein dilauryl thiodipropionic acid.

11. In a process for preparing a sterilized heat stabilized propylene polymer having a crystalline content of at least about 40% by subjecting said heat stabilized crystalline propylene polymer to a high energy radiation having a wave length shorter than ultraviolet, the improvement which comprises incorporating into said crystalline propylene polymer as a stabilizer an ester of thiodipropionic acid, said ester containing from 4 to 50 carbon atoms, prior to subjecting said crystalline propylene polymer to a sterilizing dose of at least 2.5 megarads of gamma radiation.

12. The process of claim 11 wherein said sterilizing dose of high energy radiation is gamma radiation in the range from about 2.5 to about 6 megarads.

13. The process of claim 11 wherein said propylene polymer is a homopolymer and the stabilizer is dilauryl di-thiodipropionate.

14. The process of claim 11 wherein said propylene polymer is a homopolymer and the stabilizer is from about 0.001 to 0.4 percent by weight of distearyl di-thiodipropionate.

References Cited

UNITED STATES PATENTS 3,072,603   1/1963   Tholstrup _____ 260—45.9

OTHER REFERENCES

Radiation: A tool for industry—prepared by Emerson Radio Phonograph Corp. and General Electric Company (1959) p. 194.

SAMUEL H. BLECH, Primary Examiner

R. B. TURER, Assistant Examiner

U.S. Cl. X.R.

99—174; 128—224, 321, 346; 204—159.2; 250—106; 260—45.85